US009315223B2

(12) United States Patent
Watanabe et al.

(10) Patent No.: US 9,315,223 B2
(45) Date of Patent: Apr. 19, 2016

(54) LIGHT WEIGHT INTEGRATED TAILGATE SPOILER

(71) Applicant: Honda Motor Co., Ltd., Tokyo (JP)

(72) Inventors: Makoto Watanabe, Dublin, OH (US); Robert Bator, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/251,198

(22) Filed: Apr. 11, 2014

(65) Prior Publication Data
US 2015/0291232 A1 Oct. 15, 2015

(51) Int. Cl.
B62D 35/00 (2006.01)
B60J 5/10 (2006.01)
B23K 1/00 (2006.01)
B23K 31/02 (2006.01)

(52) U.S. Cl.
CPC ............ B62D 35/007 (2013.01); B23K 1/0008 (2013.01); B23K 31/02 (2013.01); B60J 5/101 (2013.01); B23K 2201/006 (2013.01); B23K 2201/18 (2013.01); B23K 2203/20 (2013.01)

(58) Field of Classification Search
CPC .............. B60J 5/10; B60J 5/101; B60J 5/102; B60J 5/107; B60J 1/20; B60J 1/2008; B62D 35/007

USPC .......... 296/146.5, 146.8, 146.9, 180.1, 180.2
See application file for complete search history.

(56) References Cited

U.S. PATENT DOCUMENTS

| 6,659,538 | B2* | 12/2003 | Scheid ....................... 296/146.8 |
| 7,618,083 | B2* | 11/2009 | Munenaga et al. ........ 296/146.6 |
| 7,878,577 | B2 | 2/2011 | Thomas |
| 7,938,474 | B2 | 5/2011 | Bang |
| 8,523,269 | B2 | 9/2013 | Igura |
| 2012/0248814 | A1* | 10/2012 | Tsukiyama et al. ....... 296/146.8 |

FOREIGN PATENT DOCUMENTS

DE 102012102442 A1 * 9/2013 ........... B62D 35/007
JP WO2012073632 A1 * 6/2012

OTHER PUBLICATIONS

German to English Translation of DE 10 2012 102 442; retreived Sep. 2, 2015 via PatentTranslate at www.epo.org.*

* cited by examiner

Primary Examiner — Jason S Daniels
(74) Attorney, Agent, or Firm — Kenealy Vaidya LLP

(57) ABSTRACT

A lightweight metal spoiler is integrated with a tailgate of an automotive vehicle. The integrated tailgate spoiler is formed from the same material as the frame or rear portion of the tailgate body, preferably aluminum, in one arrangement and from different materials in another arrangement. First and second spoiler portions are joined together along overlapping, mating, abutting edges. The first and second portions of the tailgate are brazed together at an acute angle and the unitary spoiler is fused to the rear portion of the tailgate body.

19 Claims, 3 Drawing Sheets

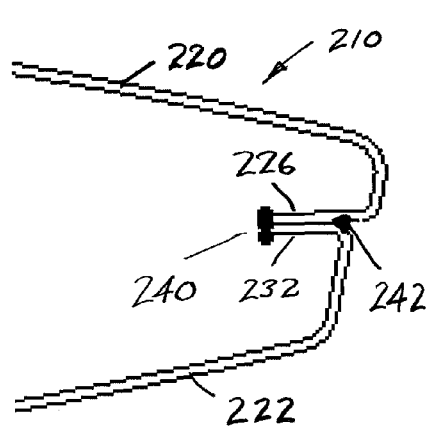
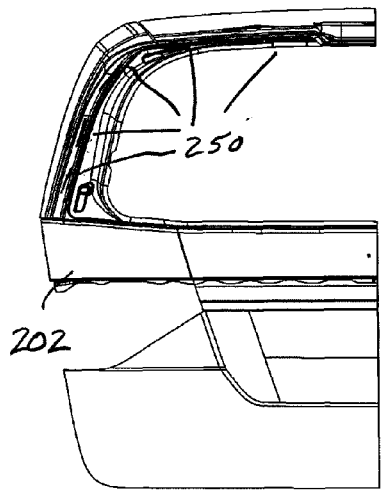
FIGURE 5
FIGURE 6
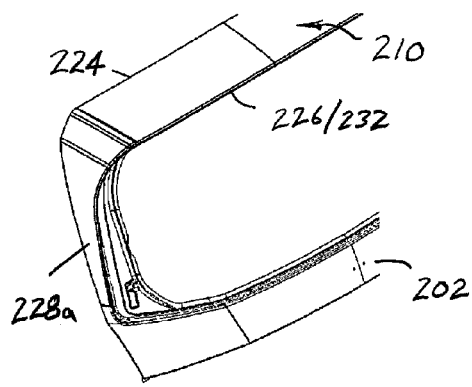
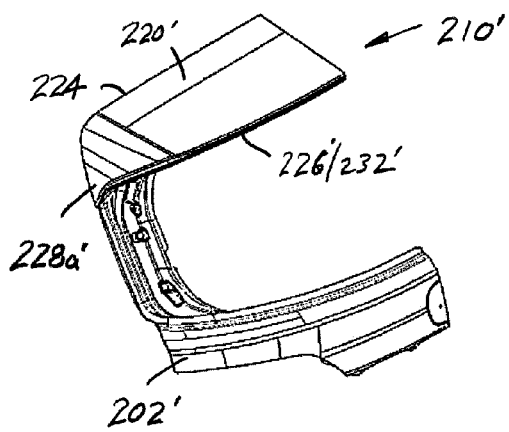
FIGURE 7
FIGURE 8

LIGHT WEIGHT INTEGRATED TAILGATE SPOILER

BACKGROUND

This disclosure relates to an automotive tailgate structure, and more particularly a light weight, integrated tailgate spoiler. One or more aspects of the present disclosure may find application in related environments and applications.

Presently, it is known to provide a spoiler on a tailgate where the tailgate is a plastic molded component that is assembled to the tailgate frame. The spoiler is a separately manufactured component from the tailgate frame. The spoiler is manufactured from plastic, e.g. plastic injection molded, subsequently painted, and then assembled to the metal body.

Although widely used, such an assembly has inherent disadvantages. First, the spoiler adds to the overall weight of the vehicle and improvements in reducing weight are always desirable. Still another area for improvement relates to overall cost. Separate manufacture, including costs associated with the molded spoiler component that is subsequently assembled to the body, results in an overall greater number of parts, an increased number of process steps, greater mass, etc.

Accordingly, a need exists for an alternative structure and method of assembling a spoiler for a tailgate that, inter alia, reduces the mass, reduces cost, improves vehicle dynamics, has less components, less manufacturing steps, is lighter weight, and contributes to improved fuel efficiency for the vehicle.

BRIEF DESCRIPTION

A lightweight metal spoiler is integrated with a tailgate of an automotive vehicle.

The integrated tailgate spoiler is formed from the same material as the frame or rear portion of the tailgate body in one arrangement, or could be dissimilar materials in another arrangement.

First and second spoiler portions are joined together along mating, abutting edges.

The first and second portions of the spoiler extend over the same width.

The first and second spoiler portions are joined together to form a one-piece member.

The spoiler first portion extends the roofline beyond a rear portion of the tailgate body, and the second portion extends from adjacent a distal end of the first portion at an acute angle relative thereto.

The first and second portions of the tailgate are joined together (e.g., hemmed, fused, welded, or brazed).

The spoiler is fused to the rear portion of the tailgate body.

The spoiler is formed from metal, for example, aluminum.

A method of assembling the tailgate spoiler assembly includes providing a spoiler first portion, providing a second spoiler portion, overlapping distal ends of the first and second spoiler portions, joining the overlapped first and second spoiler portions, and joining the joined first and second spoiler portions to the tailgate.

The method further comprises stamping the first and second spoiler portions into desired configurations.

The method includes supplying metal first and second spoiler portions.

The method also includes brazing the first and second spoiler portions together.

The method includes supplying aluminum as the metal for the first and second spoiler portions.

Primary benefits include reduced cost, lighter weight, and improved fuel efficiency.

Other benefits include reduce mass, improved vehicle dynamics (e.g., lower center of gravity and reduced polar moment of inertia, and less components.

Still other benefits and advantages of the present disclosure will become more apparent from reading and understanding the following detailed description.

BRIEF DESCRIPTION OF THE DRAWINGS

FIG. 5 is an enlarged cross-sectional view of a portion of the spoiler of FIG. 4.

FIG. 6 is a plan view of a portion of the tailgate that illustrates regions where the spoiler is secured.

FIG. 7 is a perspective view of a portion of the spoiler and tailgate assembly of the present disclosure.

FIG. 8 is a perspective view of a portion of the spoiler tailgate assembly in an alternate arrangement of the present disclosure.

DETAILED DESCRIPTION

Figure 1:
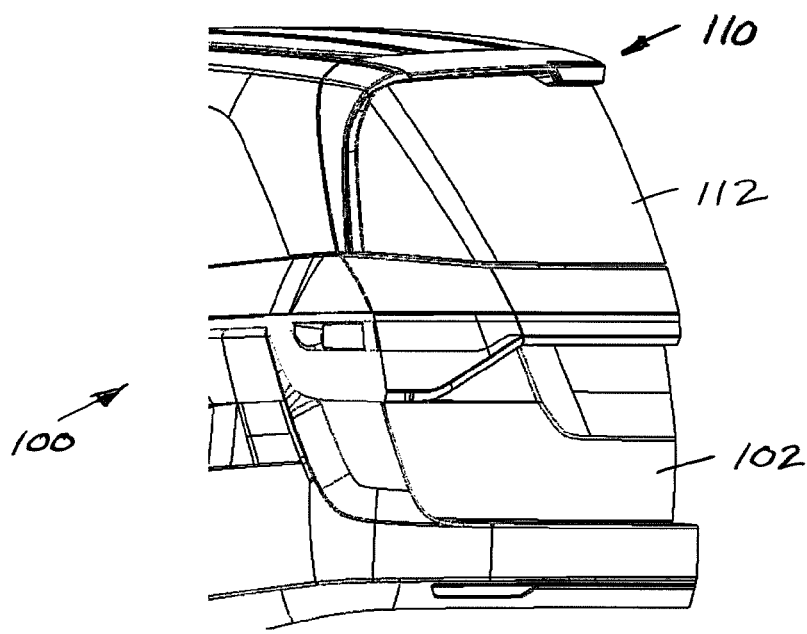
FIG. 1 generally shows a rear portion of the vehicle, namely a tailgate that incorporates a spoiler.

Turning first to FIG. 1, there is shown a rear portion of a vehicle 100 that includes a tailgate or tailgate body 102, such as a litigate that rotates about an upper, generally horizontal axis to allow ingress and egress to a rear portion of the vehicle interior. Some of these features are not shown for ease of illustration, and because these features do not specifically form a part of the present disclosure but only form a part of the environment.

A spoiler 110 is secured to the tailgate 102, and preferably along an upper perimeter portion thereof. As evident in FIG. 2, a known form of spoiler 110 includes multiple components (shown here as three separate components 110a, 110b, and 110c). These components of the spoiler 110 are typically manufactured as separate components, e.g. plastic injection molded components, that are molded, painted, and then assembled to the body which is a different material than the spoiler. The side portions 110b, 110c of the spoiler 110 extend along an upper portion of the respective perimeter side edges of the tailgate 102, for example along opposite edges of rear window 112 incorporated into the tailgate. Similarly, an upper portion 110a of the spoiler 110 is preferably secured or mounted to a frame portion of the tailgate 102 at a region above an upper edge of the window 112. As a result of injection molding these plastic spoiler components 110a-110c, a desired contour of the spoiler 110 and fit of the spoiler with the tailgate 102 can be achieved. For example, the spoiler 110 is an extension of the roofline of the rear portion of the vehicle and an extension of upper portions of the sidewalls of the vehicle frame adjacent the tailgate 102 for purposes of streamlining the contour, and exerting less drag on the vehicle. However, as briefly alluded to above, and described in greater detail below, this conventional structure and assembly method has drawbacks that are overcome with the present disclosure.

FIGS. 3-8 show a new arrangement of a spoiler 210 that is integrated, i.e., fused, welded or spot welded to the tailgate 202, again along an upper edge as well as side edges of the tailgate surrounding a rear window (not shown). As will be appreciated, reference numerals in the 200 series are generally used to refer to similar features, although the distinctions of the integrated metal spoiler of FIGS. 3-8 will be described in greater detail below and contrasted with the molded tailgate spoiler of FIGS. 1-2. Specifically, the spoiler 210 is manufactured from first and second spoiler portions or metal stampings 220, 222 (alternatively, one skilled in the art will recognize that the spoiler portions 220, 222 could be formed from multiple components that are joined together). The first spoiler portion 220 has a generally elongated planar or slightly curved contour that extends from a first or front edge 224 to a second or rear edge 226. The first spoiler portion extends the roofline contour of the vehicle beyond a rear portion of the tailgate body. This provides a cantilevered arrangement in which the rear edge 226 is spaced outwardly from the region where the front edge 224 of the first spoiler portion 220 is integrated into the tailgate body 202.

Down-turned side portions 228a, 228b extend generally perpendicularly from the planar portion 220. In the illustrated arrangement of FIGS. 3 and 7, the side portions 228a, 228b extend along substantially the entire opposite side edges of the tailgate frame 202 adjacent the rear window opening, and the side portions diminish in axial length from a maximum length at the upper end where the side edges merge into the generally planar portion 220, and diminish as the side edges extend away from the generally planar portion. This contour of the first spoiler portion 220 can be achieved in a metal stamping that provides a unitary, one-piece structure of the down-turned side portions 228a, 228b integrally extending from the generally planar contour.

In addition, a second spoiler portion or metal stamping 222 has a first or front edge 230 and a second or rear edge 232. As is perhaps best shown in FIGS. 4-5, the rear edges 226, 232 of the separate spoiler portions 220, 222 overlap with one another over a limited extent. The edges 226, 232 of the first and second spoiler portions 220, 222 are turned inwardly from the remainder of the respective spoiler portions, and are fused or brazed together as represented by reference numeral 240 at an inner, hidden location that is not evident externally when the spoiler is mounted to the vehicle or fused/brazed together at an outer location 242 where the first and second spoiler portions abut. In this manner, the first and second spoiler portions 220, 222 form a unitary, one-piece spoiler 210 formed of a unitary, preferably single, lightweight metal (e.g. aluminum) in which the front edges 224, 230 are likewise hemmed (for example, with a structural adhesive applied around the hemmed edges), fused, welded, or brazed to the vehicle frame, namely the tailgate 202. Alternatively, the spoiler 210 and tailgate 202 could be formed from dissimilar materials (e.g., the spoiler may be aluminum and the tailgate may be steel). In the illustrated arrangement of FIGS. 4-5, the first and second spoiler portions 220, 222 define an acute angle relative to one another with the vertex of the angle formed by the brazed overlapping edges 226, 232. In addition, the front edges 224, 230 of the integrated spoiler are secured (hemmed, brazed or spot-welded) to the tailgate body at spaced regions along an upper region of the tailgate frame located over the window opening.

Preferably, the brazed region 250 (FIG. 6) extends along the downward edges 228a, 228b of the spoiler 210 where the spoiler abuts against the tailgate 202 along opposite edges of the window. As a result, the spoiler 210 is integrally secured to the tailgate frame 202 at the same time that other components are connected to the frame, and subsequently painted along with the frame.

A comparison of FIG. 7 and FIG. 8 is simplified by the use of similar reference numerals with a primed suffix in FIG. 8 used to refer to like components in the embodiment of FIG. 7 for ease of understanding and brevity. The comparison illustrates that the downward edges 228a, 228b of the spoiler 210 in the embodiment of FIGS. 3-7 extend a greater length along substantially the entire outer edge of the window opening in the spoiler/tailgate design of FIG. 7, and extend only a limited downward distance along opposite edges of the window in the embodiment of FIG. 8. This of course results in a further reduction in overall weight while still achieving a streamlined termination at the rear end of the vehicle. The integrated metal tailgate spoiler 210 or 210' includes an overlapped area 226/232 that is brazed at 240 or 242 to allow the final spoiler to be longer, and narrower while still meeting strength requirements and having reduced weight. This assists in tuning the spoiler 210 or 210' for improved performance.

Figure 2:
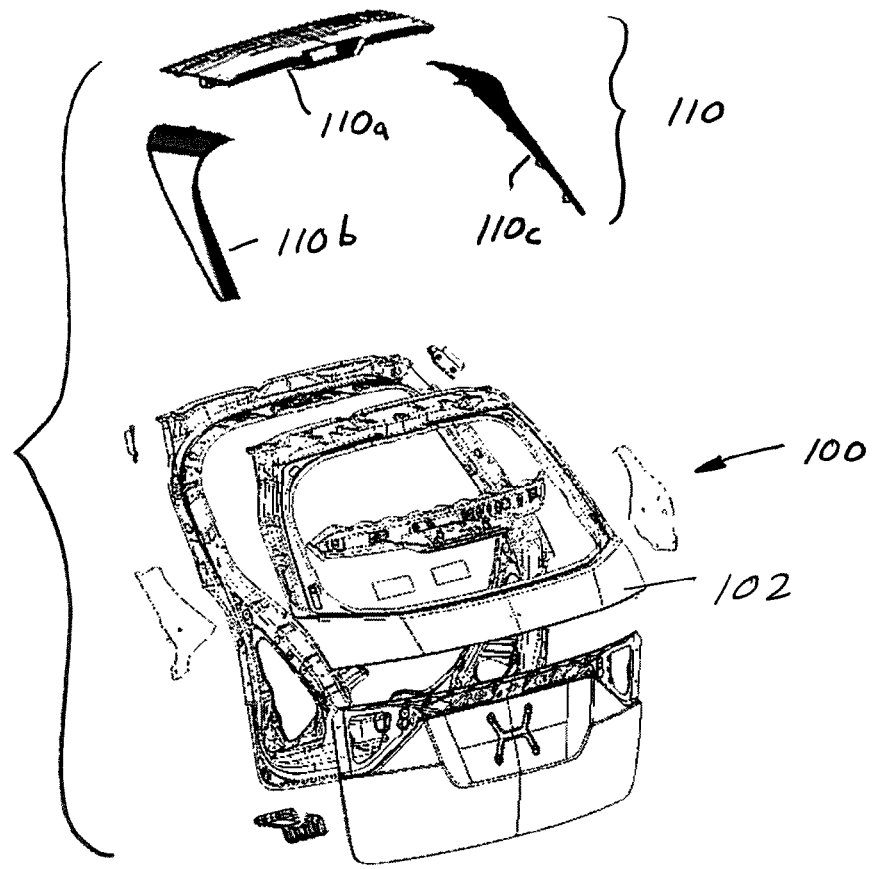
FIG. 2 shows an exploded perspective view of a prior art tailgate with spoiler components that are assembled together.
Figure 3:
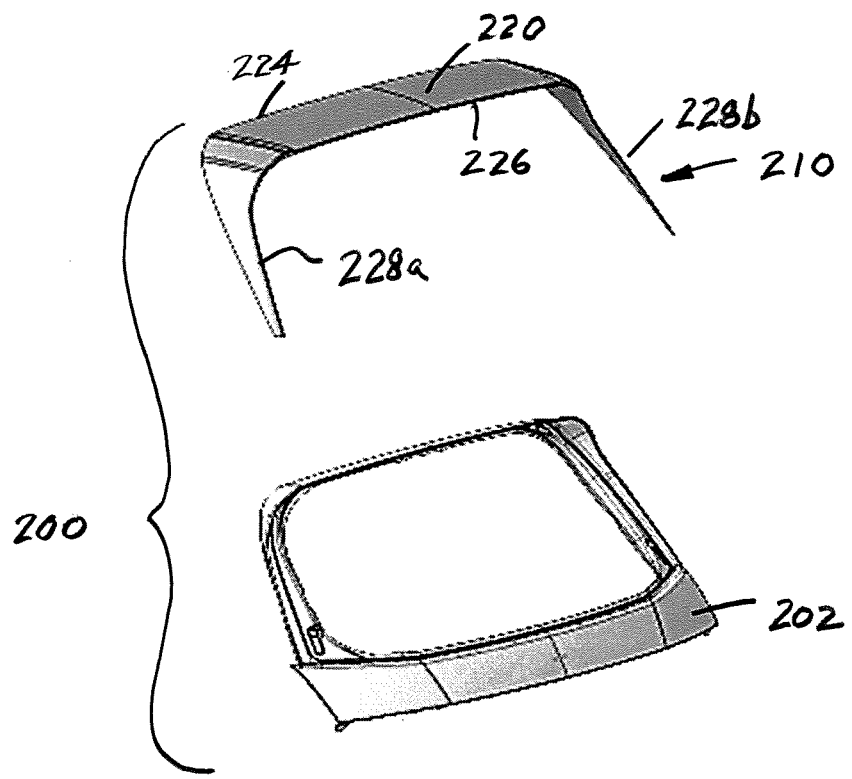
FIG. 3 is an exploded perspective view of the spoiler and portion of the tailgate of the present disclosure.
Figure 4:
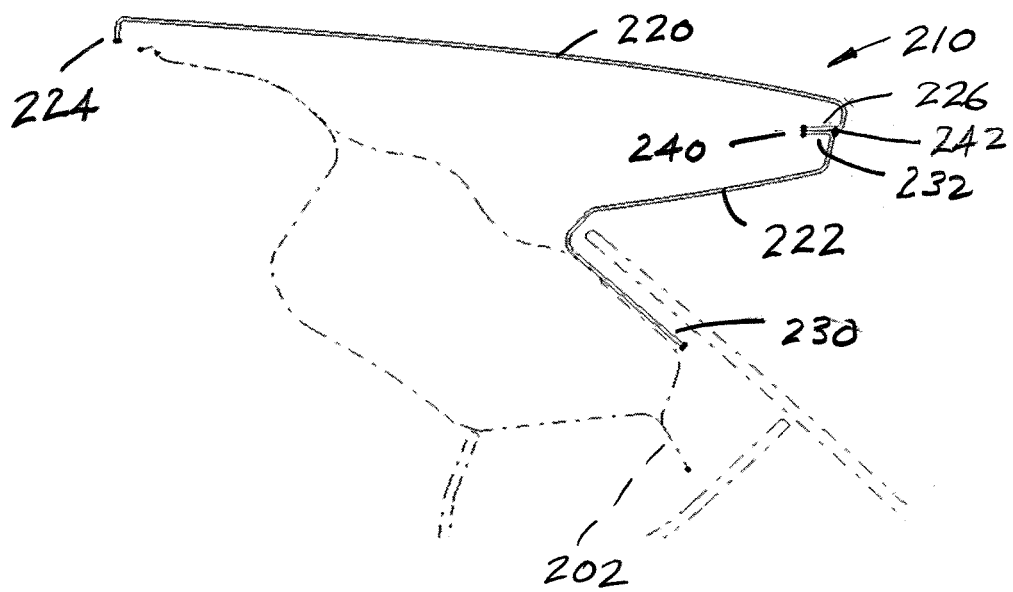
FIG. 4 is a cross-sectional view through a median portion of the spoiler, and with portions of the tailgate shown in broken line.

The integrated metal spoiler 210 or 210' of FIGS. 3-8 is substantially lighter than the prior art arrangement of FIGS. 1-2, on the order of one-fifth to one-half the weight of the plastic spoiler. This results in better fuel efficiency for the vehicle. The cost is likewise significantly reduced, not only with respect to the materials themselves but also in connection with the attendant equipment costs associated with the manufacture and assembly. Still another added benefit is that the spoiler of FIGS. 3-8 is a smaller mass situated at an upper, rearmost edge of the vehicle when compared with the plastic spoiler of FIGS. 1-2. As a result, vehicle dynamics are also advantageously improved, namely, the overall center of gravity of the vehicle is lower to the ground, and the polar moment of inertia is likewise reduced. Styling is not adversely impacted with the new design of FIGS. 3-8. Again, one skilled in the art will appreciate that selected components could be made as one piece or multiple portions joined together without departing from the scope and intent of the present disclosure.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

We claim:

1. A tailgate spoiler assembly for an associated automotive vehicle, the tailgate spoiler assembly comprising:
a tailgate body having a rear portion including upper and side portions; and
a spoiler configured to overhang in cantilever fashion from the tailgate body rear portion wherein the spoiler includes first and second portions, each of the first and second portions have a first edge continuously joined along the upper and side portions of the tailgate body, where the first edges are joined to the tailgate body at spaced locations, and each of the first and second portions have a second edge where the second edges abut one another and are joined to one another.

2. The tailgate spoiler assembly of claim 1 wherein the first and second portions of the spoiler extend over a same width.

3. The tailgate spoiler assembly of claim 1 wherein the first and second portions of the spoiler are fused together along the abutting second edges to form a one-piece member.

4. The tailgate spoiler assembly of claim 1 wherein the spoiler first portion extends a roofline of the associated automotive vehicle beyond the rear portion of the tailgate body, and the second portion extends from adjacent a distal end of the first portion at an acute angle relative thereto.

5. The tailgate spoiler assembly of claim 1 wherein the first and second portions of the spoiler overlap along the second edges thereof and are brazed together.

6. The tailgate spoiler assembly of claim 1 wherein the spoiler is fused to the rear portion of the tailgate body.

7. The tailgate spoiler assembly of claim 1 wherein the spoiler is formed from metal.

8. The tailgate spoiler assembly of claim 7 wherein the metal is aluminum.

9. A tailgate spoiler assembly on a vehicle, the tailgate spoiler assembly comprising:
a tailgate body having a rear portion; a metal spoiler configured to overhang in cantilever fashion from the tailgate body rear portion; and
the spoiler being continuously fused to the rear portion of the tailgate body and having a generally planar first portion extending downturned side second portions that extend generally perpendicularly therefrom along opposite side edges of a tailgate of the vehicle and first edges, wherein the first edges are joined to the tailgate body at spaced locations, and each of the first and second portions have a second edge where the second edges abut one another and are joined to one another.

10. The tailgate spoiler assembly of claim 9 wherein the first portion follows a roofline of the vehicle rearwardly of the tailgate body.

11. The tailgate spoiler assembly of claim 10 wherein the spoiler first and second portions include second ends that overlap one another.

12. The tailgate spoiler assembly of claim 11 wherein the spoiler first and second portions are brazed together along the overlapped second ends.

13. The tailgate spoiler assembly of claim 10 wherein the spoiler second portion extends at an acute angle from the spoiler first portion.

14. A method of assembling a spoiler assembly attached to a tailgate comprising:
providing a first spoiler portion;
providing a second spoiler portion;
overlapping distal ends of the spoiler first and second spoiler portion;
joining the overlapped ends of the first and second spoiler portions; and
joining proximal ends of the first and second spoiler portions to a tailgate at spaced locations from one another, wherein
the spoiler assembly is joined continuously to the tailgate along a width and a length of the spoiler assembly.

15. The method of claim 14 further comprising stamping the first and second spoiler portions into desired configurations.

16. The method of claim 14 wherein the providing steps include supplying metal first and second spoiler portions.

17. The method of claim 16 wherein the joining of the overlapped first and second spoiler portions includes brazing the first and second portions together.

18. The method of claim 16 wherein the metal is aluminum.

19. The method of claim 16 further comprising extending the first spoiler portion from a roofline beyond a rear portion of the tailgate, and extending the second spoiler portion from adjacent a distal end of the first spoiler portion at an acute angle relative thereto.

* * * * *